United States Patent [19]

Ratner

[11] Patent Number: 4,623,456

[45] Date of Patent: Nov. 18, 1986

[54] SELF-SEALING NECK FOR FILTER

[75] Inventor: Michael Ratner, 67-33 170th St., Flushing, N.Y. 11365

[73] Assignee: Michael Ratner, Flushing, N.Y.

[21] Appl. No.: 792,142

[22] Filed: Oct. 28, 1985

[51] Int. Cl.⁴ .............................................. B01D 35/00
[52] U.S. Cl. .................................... 210/168; 210/232; 210/416.5; 210/541; 210/542
[58] Field of Search ............... 210/232, 233, 234, 541, 210/542, 171, 172, 168, 416.5

[56]  References Cited

U.S. PATENT DOCUMENTS 4,224,161  9/1980  Anderson et al. ............... 210/416.5

Primary Examiner—Frank Sever
Attorney, Agent, or Firm—Bernard Lieberman

[57] ABSTRACT

A self-sealing neck for an oil filter comprising a filter body provided with an opening which is surrounded by a collar. The self-sealing neck includes a coupling having a central bore with an enlarged recess at one end, an outwardly extending flange at the one end, a gasket fitted or molded over the flange and covering the front end and has an inner portion seated in the recess. The self-sealing neck overlies the collar with the gasket engaging the filter body with the portion of the gasket in the recess frictionally clampingly engaging the collar and the flanged portion also sealing against the filter body.

7 Claims, 4 Drawing Figures

SELF-SEALING NECK FOR FILTER

BACKGROUND OF THE INVENTION

1. Field of the Invention

This invention relates to a self-sealing neck for oil filters used with automotive automatic transmissions.

2. Description of the Prior Art

Oil filters for automobile transmissions used in Mercedes Benz vehicles powered by internal combustion engines were of a special type employing a neck which heretofore was welded in situ to the collar on the filter itself.

Since various neck lengths exist, it has been necessary to stock several part numbers to be able to service all the types.

Frictional sealing by means of a gasket between interfitting parts is old and well known, as exemplified by the prior art.

U.S. Pat. No. 1,029,715 is directed to a hose coupling and illustrates a gasket having a flange portion confined between abutting faces. This type of construction is also shown in U.S. Pat. No. 2,278,754, which illustrates a gasket for a coffee maker. In U.S. Pat. No. 2,615,741 there is shown a gasket forming a sealing ring, while U.S. Pat. No. 3,838,713 is directed to a trailer tube and its connection and teaches the use of a gasket.

Gaskets having annular flanges extending from one end of a skirt portion are known. U.S. Pat. No. 3,998,478 is directed to a sealing gasket for joints with plastic pipes and U.S. Pat. No. 4,293,138 teaches such a gasket for use as a sealing device.

SUMMARY OF THE INVENTION

The present invention relates to a self-sealing neck for an automotive oil filter, which is designed such that a collar on the filter is inserted into the flanged end of the neck and held in place frictionally by means of an elastomeric gasket and sealed against leakage by the gasket.

In accordance with the invention, the self-sealing neck is used in combination with an oil filter for automotive transmissions having a metallic filter body provided with an opening and a collar surrounding the opening. The self-sealing neck includes a coupling having an inner bore provided with a recess enlarging the inner bore at the front end of the coupling and a flange slightly rearward of the front end with a gasket provided with an inner portion seating in the recess and on the outer portion. The flange is surrounded with a front end interconnecting portion which engages the filter body in an oil-tight manner, preferably through a sealing bead, providing supplementary sealing to the seal provided by that portion of the gasket in the recess. The primary seal provided by the gasket portion surrounding the collar is resistant to leakage because of the characteristics of the molded elastomeric gasket having a Shore "A" Hardness of approximately 50-90.

DETAILED DESCRIPTION OF THE INVENTION

Figure 1:
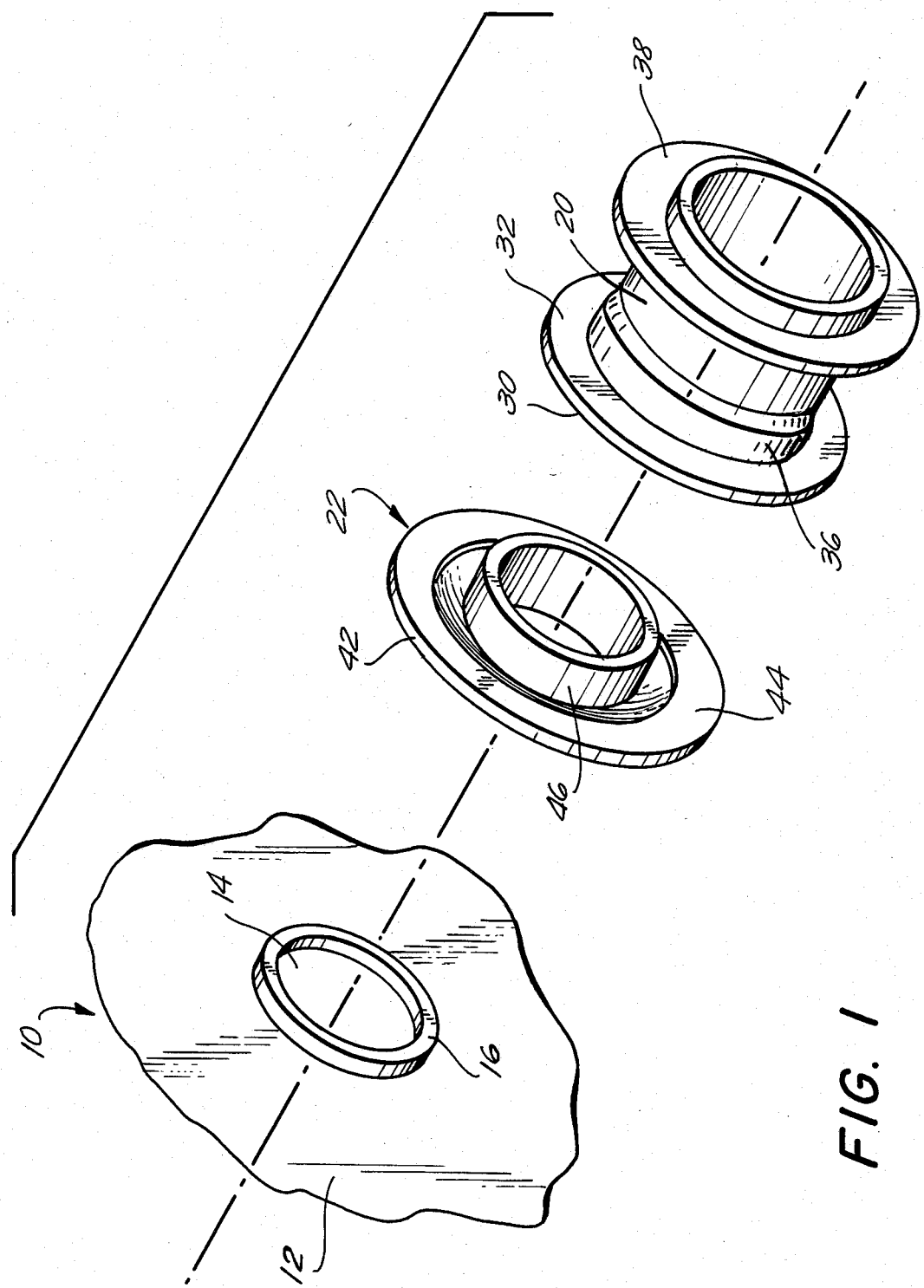
FIG. 1 is an exploded perspective view of the self-sealing neck and filter according to the present invention.
Figure 2:
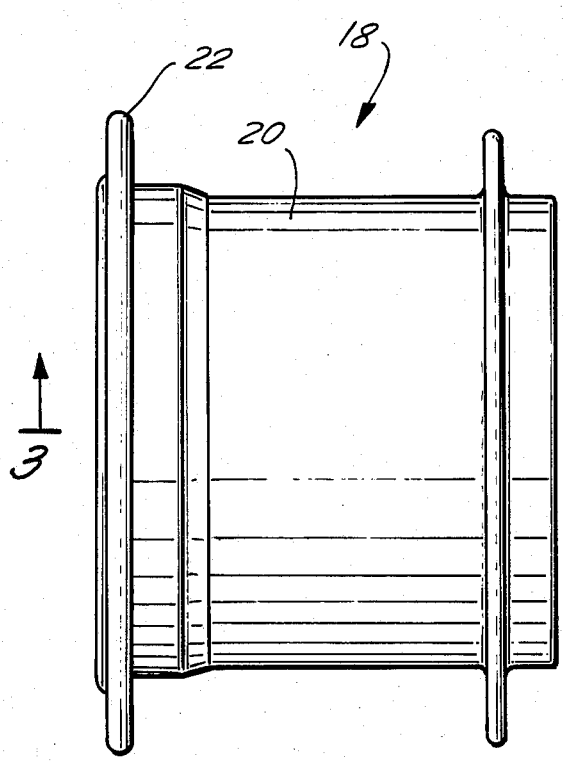
FIG. 2 is a side elevational view of the self-sealing neck.

With continuing reference to the accompanying drawing, wherein like reference numerals designate similar parts throughout the various views, reference numeral 10 generally designates a metallic oil filter, such as is used in Mercedes automotive vehicles. The filter 10 has a filter body 12 within which there is a labyrinth filter arrangement communicating with an opening 14. Surrounding the entire opening is an annular collar which extends outwardly of the filter body 12.

In the past, a neck was fitted in a surrounding position on the collar 16 and welded thereto by a special welding apparatus by the vehicle manufacturer. According to the present invention, the self-sealing neck, generally designated as 18, includes two main parts, a metallic coupling 20 and a gasket 22.

The coupling 20 is formed of any suitable metal, such as aluminum or steel, and has an inner diameter substantially the same as the outer diameter of the collar 16. The inner diameter is slightly widened to form a recess 26 at the end where the coupling fits over the collar 16. By increasing the outer diameter of the coupling at this recessed end, the thickness of the coupling walls is maintained at, generally, the same thickness at the end as along the main body portion 21. This increase in external diameter at the end is seen as shoulder 36.

Just inwardly of the end 30, which fits over the collar 16, is a peripheral flange 32. A second flange 38 is provided for use in attachment to the transmission oil inlet.

Referring now to the gasket 22, it is molded of an elastomer, typically nitrile or polyacrylic rubber, having a Shore "A" Hardness of 50-90. The gasket is molded in one piece and has a front 40 overlying the front end 30 and for contacting the filter body 12 in an oil-tight manner. Normally the gasket is permanently molded to the neck. Connected to the front 40 is an upper body 42 which overlies the flange 32, as well as a downwardly extending portion 44, which clampingly engages the rear of the flange 32. The gasket 22 further includes an inner portion 46, which fits in the recess 26. The inner portion 46 provides for a tight clamping friction fit over the outside surface of the collar 16 providing for an oil-proof friction connection of the self-sealing neck with the collar 16. The gasket 22, when placed over the coupling 20, is in a stressed condition providing for a fluid-tight fit on the coupling 20, thus eliminating an oil leakage. This is further enhanced by a sealing bead formed in the gasket which helps to conform to irregularities on the surface of filter body 12.

In use, instead of welding the neck 18 to the collar 16, the self-sealing neck is forced over the collar providing oil-proof friction fit on the collar with an oil-proof seal at the bead of the self-sealing neck and at the ring of contact with the outer surface of the collar. This eliminates the need to stock several filter assemblies by stocking only one basic filter body and using a self-sealing neck of appropriate length, which is inexpensively stocked.

The Shore "A" Hardness of from 50-90 for the gasket is important so that the neck can seal against surface irregularities of the filter body and so that, when the gasket is placed over the collar 16 under stress, it will clampingly, frictionally hold the self-sealing neck in oil-tight position.

Figure 3:
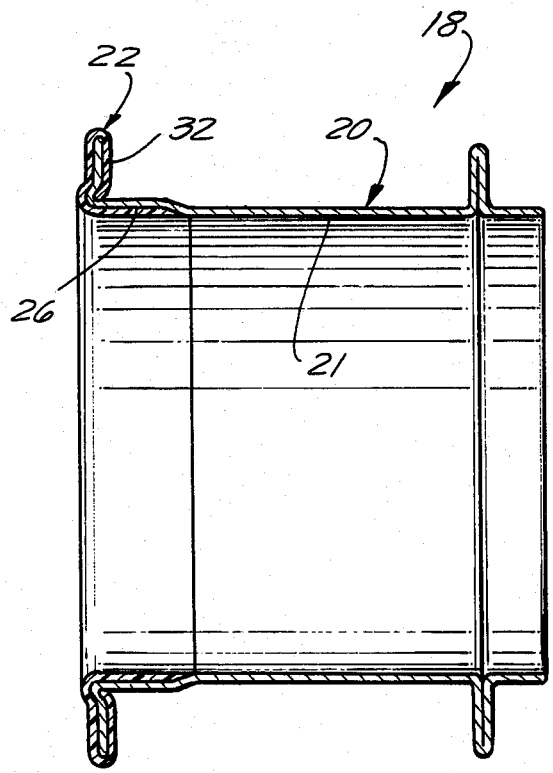
FIG. 3 is a longitudinal sectional view taken along the plane of line 3—3 in FIG. 2; and, FIG. 4 is an enlarged sectional detail view of a gasket molded with an integral bead directly on the flange.
Figure 4:
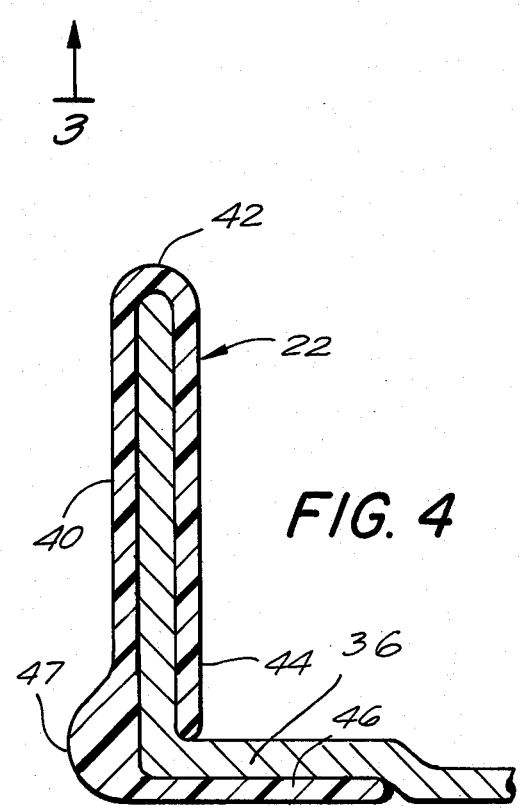

It will be noted that the gasket 22, as shown in FIG. 4, has molded therein the sealing bead 47. It is understood that where the flange 32 is provided with a bead as shown in FIG. 3, the gasket need not have the bead molded therein when preformed. In the latter case, the gasket being of pliable material will, in conforming to the flange bead, assume such a similar shape.

What is claimed is:

1. In combination with an oil filter having a filter body provided with an opening and with a collar surrounding said opening, a self-sealing neck comprising means for providing substantially universal frictional sealing between an automotive oil filter and an automatic transmission, said neck including a coupling having a gasket mounted thereon, said gasket being molded of an elastomer, typically nitrile or polyacrylic rubber, said gasket engaging said filter body and surrounding said collar in a frictional clamping and tight condition, said coupling having a recess in which said gasket fits, said coupling having a flange extending opposite to said recess, and said gasket extending around said flange.

2. A self-sealing neck according to claim 1, wherein said gasket has a bead on the end thereof contacting said filter body.

3. A self-sealing neck according to claim 1, wherein said gasket is stretched and under stress.

4. A self-sealing neck according to claim 1, wherein said gasket is molded in place.

5. A self-sealing neck according to claim 1, wherein said gasket is molded of elastomeric rubber having a Shore "A" Hardness of 50-90.

6. A self-sealing neck according to claim 1, wherein said gasket is molded of rubber having a Shore "A" Hardness of 50-90, said gasket being stretched over said flange to provide an initial stress thereon.

7. A self-sealing neck according to claim 1, wherein said gasket is molded of rubber having a Shore "A" Hardness of 50-90, said gasket being molded in place.

* * * * *